INVENTORS
BENJAMIN L. AVERBACH
PHILIP K. PEARSON

INVENTORS
BENJAMIN L. AVERBACH
PHILIP K. PEARSON

United States Patent Office 3,586,546
Patented June 22, 1971

3,586,546
METHOD FOR DETERMINING OPTIMUM FATIGUE LIFE OF BEARING STEELS
Benjamin L. Averbach, Belmont, Mass., and Philip K. Pearson, Farmington, Conn., assignors to Textron Inc., Providence, R.I.
Filed July 29, 1968, Ser. No. 748,327
Int. Cl. C21d 9/40; G01n 25/00
U.S. Cl. 148—128                                      7 Claims

ABSTRACT OF THE DISCLOSURE

A direct method is proposed for providing a tempered steel composition exhibiting optimum resistance to fatigue particularly in bearings. The method resides in subjecting each of a plurality of specimens of at least one steel composition in the quench hardened condition to a series of tempering temperature treatments, subjecting each of the tempered specimens to strength testing whereby to determine the amount of permanent set or percent elongation at failure, and then correlating the tempered specimen having substantially the maximum permanent set or percent elongation with its respective tempering temperature, the correlated temperature being the temperature at which a quench hardened element of the same steel composition may be tempered to provide optimum resistance to fatigue.

---

This invention relates to a method for determining the most desirable tempering temperature treatment for a particular quench hardened bearing steel composition, whereby to insure optimum resistance to fatigue in actual service and also to a simple and direct method for selecting steels having optimum resistance to fatigue.

Failure of a structure or machine part subjected to varying or repeated loads is referred to a failure by fatigue. Examples of machine parts susceptible to this type of failure are crankshafts, shafts carrying rotating parts, e.g. bearing assemblies, turbine blades, piston rods and the like. Generally speaking, prior to this invention, the ordinary methods of computing stresses and of determining the strength of materials under static load conditions have not been helpful in determining the ability of a metal or alloy in the high hardness ranges used for bearings to resist failure by rolling fatigue. Other things being equal, the phenomenon of fatigue is time dependent and, because of this, fatigue testing is particularly time consuming, and may require hundreds of hours of testing of several bearings for a single result. It would be desirable to provide a simple, speedy and direct method for selecting steels in accordance with a particular composition and in accordance with a particular tempering treatment capable of providing optimum resistance to fatigue.

There is considerable current interest in the application of vacuum processing techniques to the production of bearing steels. Bearing tests have shown that the $L_{10}$ life is significantly improved by these vacuum treatments and the catalog life figures have been increased correspondingly.

The $L_{10}$ life is defined as the number of hours at a given speed that 90% of a group of bearings will attain or exceed before the onset of fatigue.

It is known that improvement in fatigue life may be ascribed to a reduction in the micro inclusion content brought about by changes in deoxidation practices which are possible in vacuum steel-making processes. Although it is recognized that inclusions in a given heat of air melted steel may be comparable to a given heat of vacuum treated steel, the average cleanliness of many lots of vacuum steel generally exceed that of comparable quantities of air melt steel. There are now sufficient bearing life data which indicate that vacuum treated steels have a consistent advantage in bearing applications. It would thus be also desirable to provide a simple and direct method which would not only determine the desirable tempering treatment for insuring optimum resistance to fatigue, but which would also determine by comparison the effects of various melting techniques on fatigue properties.

It is an object of the invention to provide a simple and direct method for determining the most desirable tempering treatment capable of providing a tempered steel characterized by optimum resistance to fatigue.

Another object is to provide a simple and direct method for selecting steel compostions having optimum resistance to rolling contact fatigue without the necessity of conducting time-consuming fatigue tests.

A still further object is to provide a simple method for selecting bearing steels characterized by optimum resistance to fatigue.

Another object is to provide a simple and direct method for evaluating melting practice in terms of improved fatigue resistance of the resultant product.

These and other objects will more clearly appear when taken in conjunction with the following disclosure and the accompanying drawings, wherein.

Figure 3:
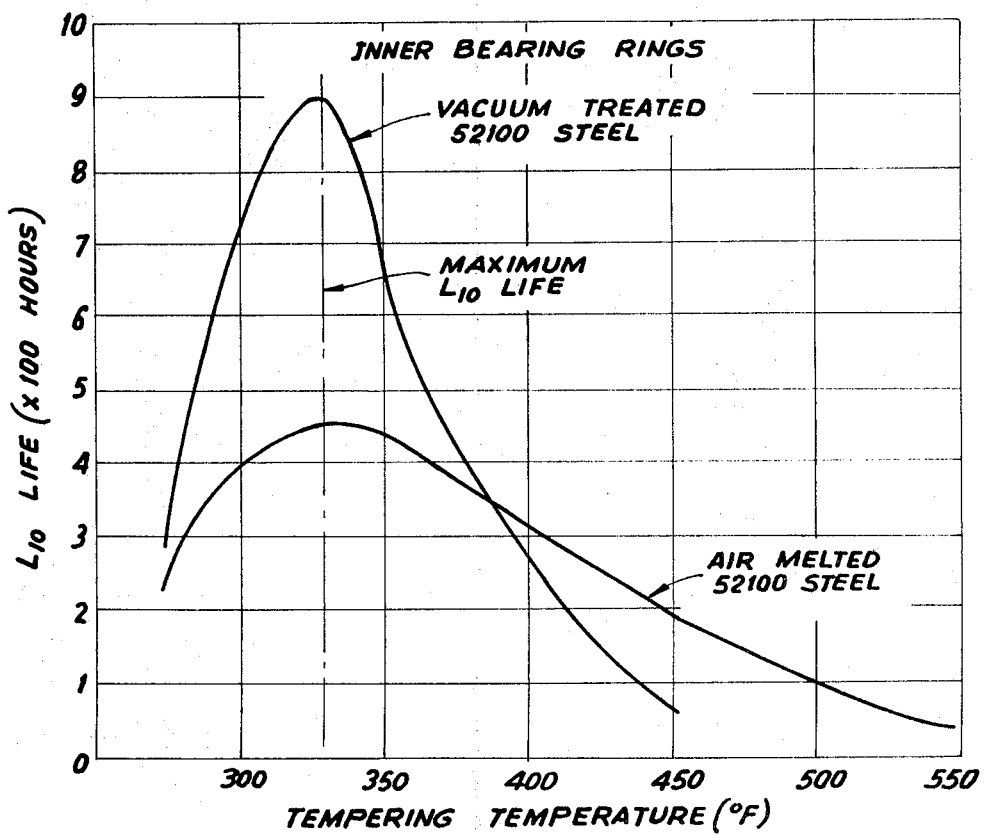
Figure 4:
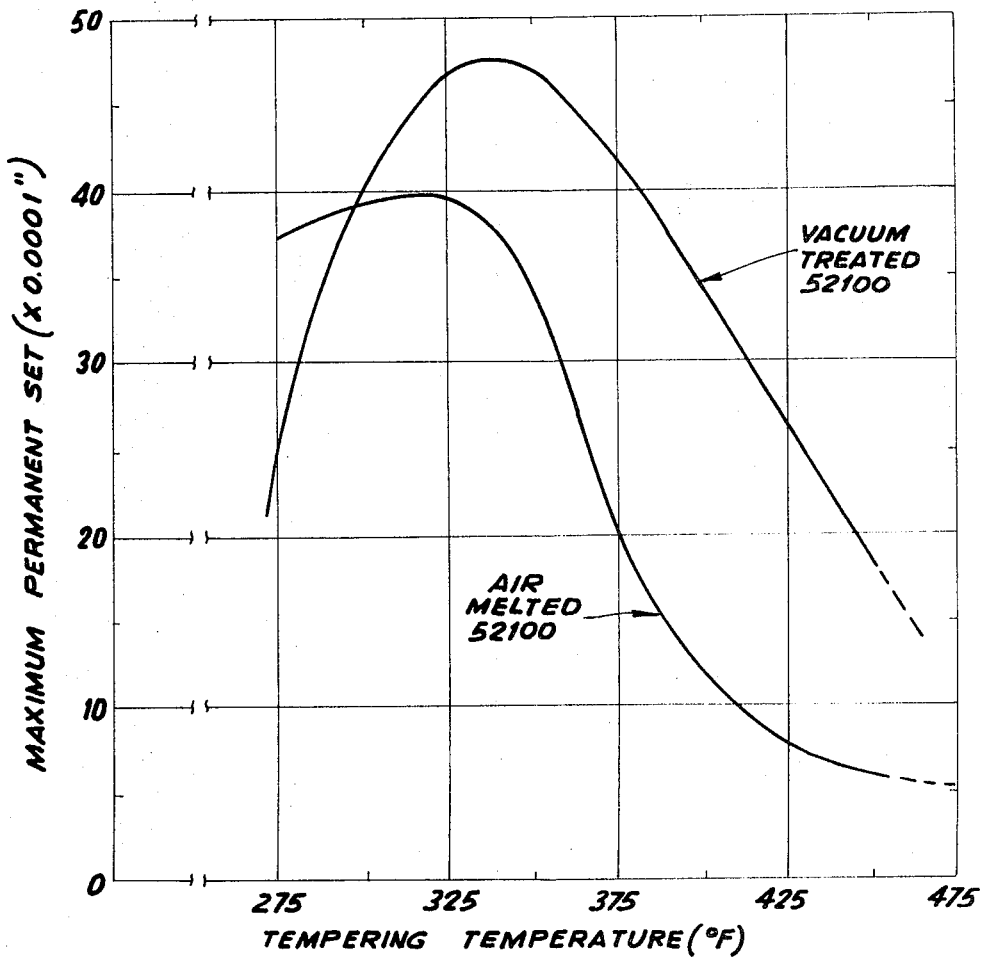

FIG. 3 compares the fatigue life of vacuum treated 52100 steel with that of air melted 52100 steel as a function of tempering temperature; and FIG. 4 illustrates another method of determining the desirable tempering temperature by measuring ductility as a permanent set obtained by applying a load to a bearing inner ring until it fails.

Stating it broadly, a method is provided for determining the desirable tempering temperature of quench hardened steel whereby to insure optimum resistance to fatigue. The method comprises subjecting each of a plurality of specimens of at least one steel composition in the quench hardened condition to a series of tempering treatments, subjecting each of the tempered specimens to strength testing whereby to determine the amount of permanent set or percent elongation at failure, and then correlating the tempered specimen having the maximum set or percent elongation with its respective tempering temperature. The correlated tempering temperature is the temperature at which a quench hardened element of the same steel composition may be tempered to provide optimum resistance to fatigue. It is found by employing the foregoing method that it is not only possible to determine the most desirable tempering treatment for a given steel composition, but also to determine which of the steel melting processes will provide optimum fatigue properties, such as air or variations in vacuum treating or melting.

For example, in the production of bearing steel, such as that known by the trade designation of 52100, air melt refers to electric furnace steel made to bearing quality. The steels referred to as vacuum treated are first melted in an electric furnace and then treated by a vacuum technique such as the Dortmund-Hörder process, ladle vacuum degassing, stream degassing, or other processes which involve a final vacuum stage in the steel making process. Another type of vacuum process is one in which a consumable electrode is employed. The steel is first produced in an electric furnace and converted into electrodes, the electrodes being thereafter remelted in a vacuum by the consumable arc process. These steels are thus melted twice, with the final melting in vacuum.

In determining the tempering temperature which will provide optimum fatigue properties, conventional tensile testing procedures may be used. Rough machined tensile bars are employed which are hardened by heating the bars in a furnace having a protective or non-decarburizing atmosphere maintained at a specified austenitizing temperature. In the case of a 52100 bearing steel comprising about 1% carbon, 1.5% chromium, and the balance substantially iron, the preferred austenitizing temperature is 1560° F.±10°, the steel being soaked for about 25 minutes followed by fast quenching to substantially room temperature. Since hardened steel exhibits low percent elongation, the test specimens must be as precise as possible. By starting with rough blanks having an eccentricity of about 0.005 inch before hardening, the eccentricity may increase to 0.007 inch after hardening. This is corrected by grinding the blank to finish size.

The finished tensile bars are 4 inches long with a gauge length of 2 inches at a diameter of about 0.187 inch. The gripping ends of the tensile bars have a diameter of about 0.56 inch. The maximum eccentricity allowable in the finished tensile bar is 0.001 inch, most of the bars having an eccentricity well below this value. To insure failure of the test specimen within the gauge length, the gauge section is tapered about 0.001 inch towards the center. The electrical strain gauges are employed measuring ⅛ × ¼ inch, the gauges being attached to the test piece with epoxy cement. Positive gripping of the tensile specimen is achieved by employing a split collet to fit over the shoulders of the test bars. Long flexible members of about 18 inches in length seated in spherical bearings are employed between the grips and the heads of the testing machine. In practice, the specimen is aligned visually using a light load. If the strain gauges indicate the presence of a bending component, this is corrected by rotating the grips in the spherical bearing. By accurately grinding the tensile specimen and by using the aforementioned grip arrangement, excellent axiality can be assured. Stress and strain data are obtained manually and the proportional limit, 0.2% yield, ultimate stress and percent elongation are determined in the usual fashion. In obtaining the tabulated data, an average of ten specimens from several lots were employed in many instances to insure representative results.

In one set of results, two types of oil quenches were used, one set of specimens in well agitated oil at 130° F. and the other set in circulating oil at 375° F., then held for 3 minutes and air cooled to room temperature. The resultant retained austenite was very similar for both types of oil quench. The vacuum treated and air melt steels exhibited very similar retained austenity and hardness values. The following test data are representative of both types of steels.

TABLE 1

[52100 steel austenized at 1,560° F. oil quenched and tempered 4 hours at temperature]

| Tempering temperature, ° F. | Hardness, Rockwell C | Retained austenite, vol., percent |
| --- | --- | --- |
| As quenched | 66 | 13.0 |
| 275 | 64.5 | 12.0 |
| 300 | 63.5 | 11.5 |
| 330 | 62.5 | 10.5 |
| 350 | 62.5 | 10.0 |
| 385 | 62 | 7.5 |
| 420 | 61 | 3.5 |
| 450 | 60 | 4.0 |
| 500 | 59.5 | 0 |
| 550 | 59 | 0 |

The average values are rounded out to the nearest 0.5%. The mechanical properties also did not show any distinction between the two oil quenches. The effect of tempering on the mechanical properties of air melt and vacuum treated 52100 steel is given in Tables 2 and 3, respectively.

TABLE 2

[Air melt 52100 steel]

| Tempering temp. (° F.) | Proportional limit ($10^3$ p.s.i.) | 0.2% yield ($10^3$ p.s.i.) | Ultimate ($10^3$ p.s.i.) | Percent elongation |
| --- | --- | --- | --- | --- |
| As quenched | 45 | | 185 | 0.15 |
| 275 | 60 | 190 | 215 | 0.25 |
| 300 | 70 | 215 | 245 | 0.35 |
| 330 | 75 | 230 | 260 | 0.40 |
| 350 | 75 | 250 | 270 | 0.40 |
| 385 | 75 | 265 | 295 | 0.35 |
| 420 | 95 | 310 | 320 | 0.35 |
| 450 | 110 | 310 | 310 | 0.25 |

TABLE 3

[Vacuum treated 52100 steel]

| Tempering temp. (° F.) | Proportional limit ($10^3$ p.s.i.) | 0.2% yield ($10^3$ p.s.i.) | Ultimate ($10^3$ p.s.i.) | Percent elongation |
| --- | --- | --- | --- | --- |
| As quenched | 43 | | 170 | 0.15 |
| 275 | 64 | 200 | 220 | 0.30 |
| 300 | 56 | 215 | 260 | 0.40 |
| 330 | 75 | 230 | 260 | 0.45 |
| 350 | 62 | 245 | 285 | 0.60 |
| 385 | 66 | 275 | 300 | 0.50 |
| 420 | 89 | 305 | 315 | 0.40 |
| 450 | 132 | 300 | 320 | 0.20 |

Each of the values in Tables 2 and 3 was obtained as an average of 8 to 10 tests. The scatter of elongation values for tempering temperatures near 350° F. and below were reasonable. However, at temperatures over 385° F., for example at 420° F. and 450° F., the individual elongation values exhibited a large spread. From the number of specimens tested, it was concluded that this behavior was characteristic of the higher tempering temperatures.

A plot of percent elongation vs. tempering temperature (note FIG. 1) indicated that the elongation exhibited a maximum in the neighborhood of about 350° F. for both the air melt and vacuum treated steels, except that the vacuum treated lot indicated a noticeably higher ductility level than the air melt steel.

Figure 2:
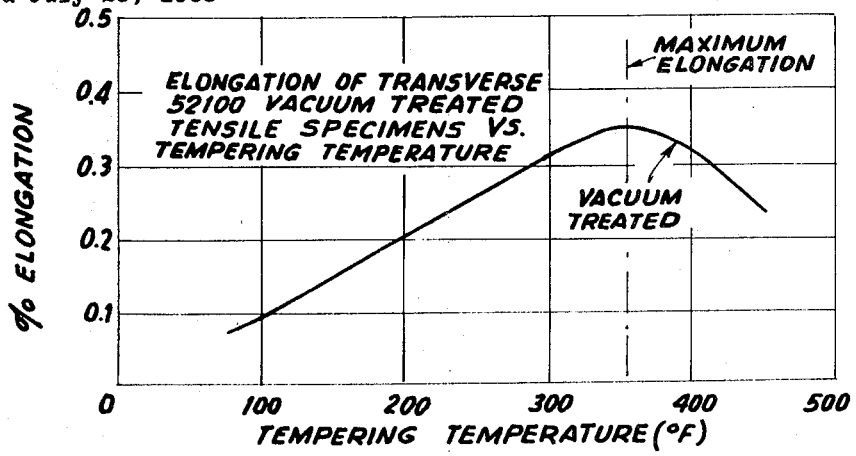
FIG. 2 is similar to FIG. 1 but differs in that the percent elongation is determined from a transverse section of vacuum treated 52100 steel.

Physical properties determined in the transverse direction of the steel specimens indicated similar results, except that the elongation values are not as high as those obtained in the longitudinal direction. However, in the case of the vacuum treated steel, maximum elongation was indicated at a tempering temperature in the neighborhood of about 350° F. (note FIG. 2). In the case of the air melt steel, maximum elongation in the transverse direction was indicated at a tempering temperature in the neighborhood of about 300° F.

Tests on deep-hardening modification, ASTM A–485, grade 2, containing about 1% carbon, 1.5% Cr, 1.5% Mn and the balance substantially iron used in bearing applications involving large sections indicated that the tempering behavior of this steel is somewhat different than for standard 52100 steel. A slightly higher tempering temperature is required to achieve a given hardness, the retardation in tempering being apparently associated with the effect of additional manganese in slowing both the retained austenite decomposition and the precipitation of carbides in the first and third stages of tempering. The tensile properties were high and the ductility was good.

Having correlated ductility values with tempering temperature, full scale bearing fatigue tests were conducted to obtain comparison data. The tests were run on bearings with a 35 mm. bore. The bearings were of the deep groove, non-filling slot construction with a 9⁷⁄₁₆ inch ball complement having a bore of 35 mm., an outer diameter of 72 mm. and an inner and outer width of 17 mm. The tests were run with grease lubrication at 1000 r.p.m., using a radial load of 2450 lbs. The resultant Hertz mean compressive stress on the inner rings was 313,000 p.s.i., and the corresponding maximum compressive stress was 470,000 p.s.i. A few tests were run at 3000 r.p.m. using SAE 30 mineral oil with jet lubrication and comparisons showed that these test conditions were statistically equivalent. For convenience, the results are expressed in terms of life at 1000 r.p.m. In comparing bearing lives, a life of 100 hours at 3000 r.p.m. is equivalent to a life of 300 hours at 1000 r.p.m., that is, both exhibit a total life of 300,000 revolutions which is a basic measure of bearing life. In this case, life is expressed in terms of 1000 r.p.m. At least 12 bearings were tested for each tempering temperature and, in many instances, more than 40 bearings were run at a particular test condition. The inner rings of the bearings were the test pieces with which rolling contact fatigue failures were determined. The ball hardness was the same for all of the bearing tests, with the hardness ranging from 63 to 65 Rockwell C. The number of bearings and the corresponding number of failures of inner rings are listed in Tables 4 and 5. The number of failures in each test was sufficient to obtain a good estimate of the $L_{10}$ life, i.e. the life which is exceeded by 90% of the bearings. Bearings which failed by other mechanisms were treated as incomplete tests, using the method described by Leonard G. Johnson (The Statistical Treatment of Fatigue Experiments, Elsevier [1964]).

TABLE 4

[Bearing tests for inner rings of air melt 52100 steel]

| Tempering temp. (° F.): | $L_{10}$ life, hours | Bearings tested | Inner ring failures | Relative confidence, percent [1] |
|---|---|---|---|---|
| 275 | 230 | 48 | 6 | |
| 330 | 450 | 46 | 2 | 95 |
| 350 | 440 | 34 | 2 | 92 |
| 385 | 330 | 50 | 4 | 78 |
| 420 | 42 | 12 | 6 | 99 |
| 450 | 215 | 46 | 8 | 62 |
| 500 | 80 | 16 | 2 | 95 |
| 550 | 33 | 15 | 7 | 99 |
| Average | | | | 87 |

[1] Relative to life of bearings tempered at 275° F.

TABLE 5

[Bearing tests for inner rings of vacuum treated 52100 steel]

| Tempering temp. (° F.): | $L_{10}$ life, hours | Bearings tested | Inner ring failures | Relative confidence, percent |
|---|---|---|---|---|
| 275 | 200 | 12 | 2 | |
| 330 | 900 | 12 | 0 | 98 |
| 350 | 610 | 11 | 2 | 92 |
| 385 | 345 | 12 | 3 | 72 |
| 450 | 50 | 12 | 4 | 96 |
| Average | | | | 89 |

[1] Relative to life of bearings tempered at 275° F.

Some care is required in assessing the confidence limits of $L_{10}$ life data obtained from the tests. For example, in Table 4, the inner rings tempered at 450° F., 46 bearings were tested and 8 inner failures were observed, the remainder being suspended tests. However, these data were sufficient to establish the $L_{10}$ life with reasonably good confidence limits, since, according to the Johnson publication, the confidence band depends primarily on the number of failures observed. On the other hand, with regard to the bearings tempered at 330° F., 46 bearings were run in which only two inner failures occurred with rather long bearing lives. There were also many suspended tests with very long running times. Since only two failures were observed, the confidence band is very wide and the procedure does not adequately reflect the large number of very successful inner rings. Therefore, a procedure was adopted which uses the concept of relative confidence numbers. Thus, in developing the confidence rating of Table 4, the life obtained for the 275° F. tempering treatment is used as a base line. Using the result obtained for 330° F. tempering, the confidence number is determined according to Johnson's method, the number expressing the probability in percent that the $L_{10}$ life for 330° F. tempering is greater than the value for 275° F. The probability calculation takes into account the number of tests run, and the resultant confidence, 95%, is high. It will be noted that the average value of all the confidence numbers is 87%, which is considered as an approximate gauge of the confidence in the trend shown by all of the life values in the tables. What has been said for Table 4 applies equally to the data of Table 5 (vacuum treated 52100 steel).

The bearing life data of Tables 4 and 5 are illustrated graphically in FIG. 3. It may be estimated that there is an 87 and 89 percent probability, respectively, that the trend in the curves is correct. Both curves show that there is a definite peak in the bearing life when the two steels are tempered in the neighborhood of about 350° E., thus confirming substantially the same trends depicted in the more simple and direct method depicted by FIGS. 1 and 2. The lives after the 450° F. temper are significantly lower than the 350° F. values, and both the 420° F. and 450° F. tests result in considerable scatter with a few very low bearing lives. The scatter observed in the bearing test for the high tempering temperatures is similar to that observed in the ductility values obtained during static testing.

It is suggested that the same microstructural factors which reduce the ductility probably play a similar role in reducing the rolling contact fatigue life. FIG. 3 points up the marked superiority of the vacuum treated 52100 steel as compared to air melt 52100. Since vacuum treatments in steel making have been associated with the reduction of micro inclusions, it would be expected that actual bearing tests would be more sensitive to such differences than the statically obtained ductility data. The benefit derived from ductility is the ability to avoid stress concentrations at inclusions. However, where only a few inclusions are present, good bearing life can be expected at lower ductility values.

While tensile testing has been described as one method that can be employed in determining optimum ductility correlated to the desired tempering temperature, similar comparative results can be obtained using ductility tests determined from the inner bearing rings themselves. The ductility test in this instance comprises applying a load to an inner ring in two hundred pound increments until failure occurs. After each load increments, the permanent set is measured. The permanent set just prior to fracture is taken as the measure of ductility.

The foregoing test, when applied to quench hardened vacuum treated and air melted 52100 steel, gave results corresponding to ductility determined as percent elongation, in that a peak in permanent set was observed in the tempering range of about 330° F. to 350° F., the ductility being higher for the vacuum treated steel. The results of these tests are depicted in FIG. 4. The rings tested were made from 52100 tubing, the finished rings having an O.D. of 2.7835±0.001″, a bore of 2.4085±0.001″ and a width of 0.475±0.002″.

Figure 1:
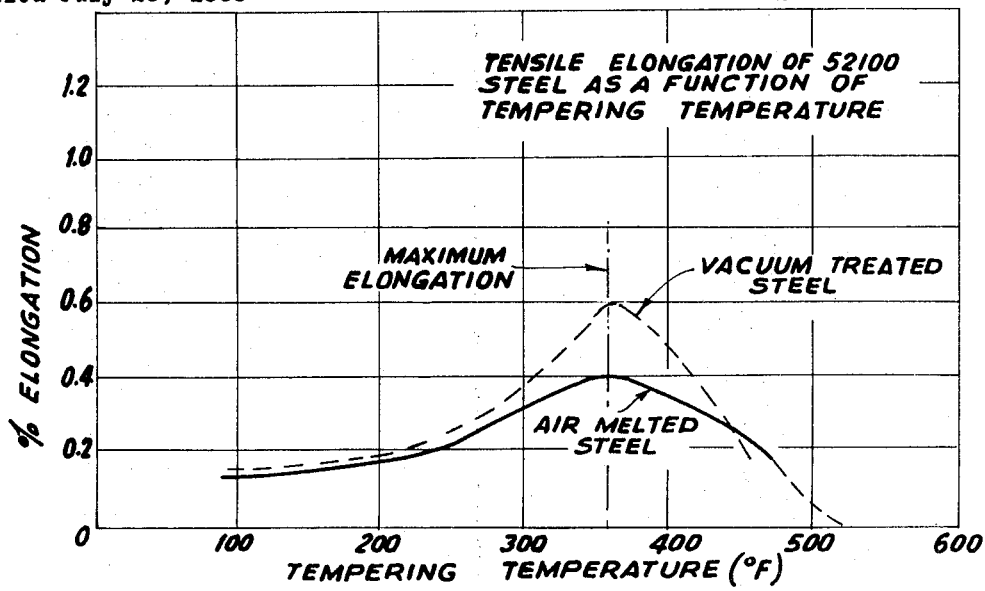
FIG. 1 is a chart showing percent elongation (tensile testing) as a function of tempering temperature for vacuum treated and air melted 52100 steel.

As will be apparent by comparing FIG. 4 with FIG. 1, the ductility can be expressed as a permanent set just prior to or at fracture or as percent elongation obtained from a tensile specimen. The term "permanent set" is employed generally herein to cover any physical testing method of determining ductility where permanent strain results from employing a strength evaluating test.

An important advantage of the invention is that the ductility comparison technique can also be used in selecting steel grades exhibiting greatly improved resistance to fatigue or for selecting steel grades less expensive than say 52100 steel but being at least comparable in fatigue properties. As illustrative of the latter, fatigue tests were conducted on a lower carbon bearing steel containing nickel known by the designation EX-2 (0.7% C, 0.22% Cr, 0.35% Mn, 0.28% Si, 0.10% Mo, 0.85% Ni and the balance iron) and on 52100 steel (1.0% C, 1.45% Cr, 0.35% Mn, 0.28% Si, 0.08% Mo, 0.35% max Ni and the balance iron) wherein the former steel composition exhibited a bearing fatigue life of 200 hours as compared to 41 hours for vacuum treated 52100 steel.

Generally, the type of steels that can be evaluated using the simple, direct method of the invention includes: through hardened bearing steels having a hardness of at least about 55 Rockwell "C" ($R_C$) and higher. Thus, any carbon-containing steel of, for example, the tool steel variety which can be heat treated by quenching from austenite to a hardness of at least about 55 $R_C$ or higher can be evaluated by the method of the invention. Examples of such steels are 52100 comprising about 0.95 to 1.1% carbon, 1.3 to 1.6% chromium, 0.25 to 0.45% manganese, 0.2 to 0.35% of silicon and the balance iron and minor residuals; a steel referred to by the designation EX-2 comprising about 0.64 to 0.75% carbon, 0.15 to 0.3% chromium, 0.25 to 0.45% manganese, 0.2 to 0.35% silicon, 0.08 to 0.15% molybdenum, 0.7 to 1% nickel and the balance iron and minor residuals; a deep hardening steel referred to as DHA comprising about 0.87 to 0.97% carbon, 1.4 to 1.7% chromium, 1.4 to 1.7% manganese, 0.6 to 0.8% silicon and the balance iron and minor residuals; a stainless steel composition identified as 440C containing 0.95 to 1.2% carbon, 16 to 18% chromium, 0.75% max. molybdenum, 1% max. manganese, 1% max. silicon and the balance iron and minor residuals; a modified type 440C stainless steel comprising 1 to 1.1% carbon, 13 to 15% chromium, 0.4 to 0.7% manganese, 0.2 to 0.4% silicon, 3.75 to 4.25% molybdenum and the balance iron and residuals; a steel identified as M50 comprising about 0.77 to 0.85% carbon, 3.75 to 4.25% chromium, 4 to 4.5% molybdenum, 0.9 to 1.1% vanadium and the balance iron and residuals; and a high speed steel referred to as AISI M-2 containing about 0.8% carbon, 4% chromium, 6% molybdenum, 2% vanadium and the balance iron and residuals. As stated above, the foregoing and similar carbon-containing tool steels exhibit a through hardness in the quenched condition of over 55 $R_C$ and more commonly over 60 $R_C$.

While the invention has been described as a method for determining the desirable tempering temperature for a quench hardened bearing steel composition so as to provide a bearing element having optimum resistance to rolling contact fatigue, it will be appreciated by those skilled in the art that the method of the invention has a variety of applications.

For example, the invention can be employed for selecting a particular steel composition which will provide maximum fatigue properties or, if desired, the method can be employed for selecting a particular steel melting practice for producing a particular steel composition which will exhibit the desired optimum resistance to rolling contact fatigue. In selecting the desirable melting practice, a plurality of heats of a particular bearing steel composition would be provided produced, for example, by such practices as air melting, vacuum melting, electrode melting, and the like. Specimens of such heats in the quench hardened condition would then be subjected to a series of tempering temperature treatments, following which the tempered specimens would be subjcted to the strength evaluating test described hereinbefore. Upon completion of the tests, that melting practice would be selected which exhibits maximum permanent set correlated to a particular tempering temperature.

As will also be apparent to those skilled in the art, the invention may be employed for segregating those particular heats of a particular melting practice in accordance with optimum fatigue properties. As is well known, not all heats of substantially the same bearing steel composition produced with the same melting practice will necessarily have the same properties as variations may occur during the melting and production of each heat, due to variations in furnacing conditions. Thus, the tests described herinabove could be employed in segregating the best heats from the inferior heats.

The invention can also be employed for determining the optimum heat treatment conditions of a particular heat of a bearing steel composition in which the quench hardened heat treatment might be varied. The evaluation in this instance would comprise subjecting a plurality of specimens of a particular heat to a plurality of quench hardening heat treatments, following which each group of specimens would then be subjected to a series of tempering temperature treatments. Each of the tempered specimens would then be subjected to a strength evaluating test, which would include determining the amount of permanent set at failure. Following this, the tempered specimen having the maximum permanent set as a result of a particular quench hardening heating treatment and tempering treatment would be used as the reference in selecting that quench hardening heat treatment and related tempering temperature for producing a bearing element having optimum resistance to rolling contact fatigue.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for providing a tempered steel element exhibiting optimum resistance to failure by rolling contact fatigue, the improvement comprising, subjecting each of a plurality of specimens of at least one steel composition in the quench hardened condition to a series of tempering temperature treatments, subjecting each of the tempered specimens to a strength evaluating test, including determining the amount of permanent set at failure, correlating the tempered specimen of a selected steel composition exhibiting the maximum permanent set with its respective tempering temperature, said correlated tempering temperature being the temperature at which a quench hardened element of the same steel composition may be tempered to provide optimum resistance to failure by rolling contact fatigue, providing at least one steel element in the quench hardened condition, and then tempering said quench hardened steel element at said correlated tempering temperature.

2. The method of claim 1, wherein the steel composition to which the method is supplied is selected from the group consisting of the following illustrative bearing steel compositions: a type 52100 steel containing about 0.95 to 1.1% C, about 1.3 to 1.6% Cr, about 0.25 to 0.45% Mn, about 0.2 to 0.35% Si, and the balance essentially iron; a nickel-containing bearing steel containing about 0.64 to 0.75% C, about 0.15 to 0.3% Cr, about 0.25 to 0.45% Mn, about 0.2 to 0.35% Si, about 0.08 to 0.15% Mo, about 0.7 to 1% Ni, and the balance essentially iron; a deep hardening bearing steel containing about 0.87 to 0.97% C, about 1.4 to 1.7% Cr, about 1.4 to 1.7% Mn, about 0.6 to 0.8% Si, and the balance essentially iron; a 440C type stainless steel containing about 0.95 to 1.2% C, about 16 to 18% Cr, up to about 0.75% max Mo, up to about 1% Mn, up to about 1% Si and the balance essentially iron; a modified 440C type stainless steel containing about 1 to 1.1% C, about 13 to 15% Cr, about 0.4 to 0.7% Mn, about 0.2 to 0.4% Si, about 3.75 to 4.25% Mo and the balance essentially iron; and a bearing steel identified as type M50 containing about 0.77 to 0.85% C, about 3.75 to 4.25% Cr, about 4 to 4.35% Mo, about 0.9 to 1.1% V and the balance essentially iron.

3. In a method for providing a tempered bearing steel element having optimum resistance to failure by rolling contact fatigue, the improvement comprising, subjecting each of a plurality of specimens of at least one carbon-containing bearing steel composition in the quench hardened condition of at least about 55 $R_C$ to a series of tempering temperature treatments, subjecting each of the tempered specimens to a strength evaluating test, including determining the amount of percent elongation at failure, correlating the tempered specimen having the maximum percent elongation with its respective tempering temperature, providing at least one bearing steel element in the quench hardened condition, and then subjecting said quench hardened bearing steel element of the same bearing steel composition to said correlated tempering temperature whereby to provide a tempered bearing steel element exhibiting optimum resistance to failure by rolling contact fatigue.

4. A method for providing a tempered steel element of a selected steel composition characterized by optimum resistance to rolling contact fatigue which comprises, subjecting each of a plurality of specimens of a plurality of carbon-containing steel compositions in the quench hardened condition of at least about 55 $R_C$ to a series of tempering temperature treatments, subjecting each of the tempered specimens to a strength evaluating test, including determining the amount of permanent set at failure, correlating the permanent set of each of the tempered specimens with its respective tempering temperature, selecting that composition exhibiting the maximum permanent set correlated to its tempering temperature, producing at least one steel element from said selected steel composition in the quench hardened condition, and then subjecting said steel element to the correlated tempering temperature, whereby to provide a tempered steel element characterized by optimum resistance to failure by rolling contact fatigue.

5. In a method for selecting a steel melting practice for producing a bearing steel characterized by optimum resistance to failure by rolling contact fatigue, the improvement which comprises, producing a plurality of heats of a particular bearing steel composition by using a plurality of steel melting practices, subjecting specimens of said heats in the quench hardened condition related to the corresponding melting practice to a series of tempering temperature treatments, subjecting each of the tempered specimens to a strength evaluating test in which the amount of permanent set at failure is determined correlating the tempered specimen having the maximum permanent set with its respective tempering temperature, selecting that melting practice providing the highest permanent set in order to provide optimum resistance to failure by rolling contact fatigue for the selected tempered steel composition produced by said practice, producing at least one steel element from the selected composition in the quench hardened condition, and then subjecting said steel element to said correlated tempering temperature.

6. A method for segregating a plurality of heats of a particular melting practice to produce steel elements characterized by optimum rolling contact fatigue properties which comprises, producing a plurality of heats of a particular composition using the same melting practice, subjecting specimens of each of said heats in the quench hardened condition to a specified tempering treatment, subjecting each of said tempered specimens to a strength evaluating test, including determining the amount of permanent set at failure, correlating the tempered specimen having the maximum permanent set with its particular heat number, selecting those heats providing the highest permanent set in order to provide optimum resistance to failure by rolling contact fatigue, producing steel elements from said selected heats in the quench hardened condition, and then subjecting said steel elements to their correlated tempering temperature.

7. A method for determining the optimum heat treatment condition of a particular heat of a bearing steel composition whereby to provide a tempered bearing steel element exhibiting optimum resistance to failure by rolling contact fatigue, the improvement comprising, subjecting specimens of said heat to a plurality of quench hardening heat treatments, subjecting specimens of each quench hardening treatment to a series of tempering temperature treatments, subjecting each of the tempered specimens of a particular quench hardening heat treatment to a strength evaluating test, including determining the amount of permanent set at failure, correlating the tempered specimen having the maximum permanent set with its respective quench hardening heat treatment and tempering temperature, selecting that quench hardening heat treatment and related tempering temperature for producing a bearing element characterized by optimum resistance to rolling contact fatigue and producing a bearing element in the correlated quench hardened and tempered condition.

References Cited
UNITED STATES PATENTS

| | | | |
|---|---|---|---|
| 2,041,649 | 5/1936 | Styri | 148—128X |
| 2,265,973 | 12/1941 | Cohen | 148—128X |
| 2,377,590 | 6/1945 | Talalay | 73—15X |
| 2,436,317 | 2/1948 | Manjoine | 73—15.6 |
| 2,559,016 | 7/1951 | Grossmann | 73—15 |
| 3,318,142 | 5/1967 | Shoemaker | 73—95 |
| 3,453,863 | 7/1969 | Scott | 73—15 |

JAMES J. GILL, Primary Examiner

U.S. Cl. X.R.

73—15.6